United States Patent [19]

Cottone

[11] Patent Number: 5,574,256
[45] Date of Patent: Nov. 12, 1996

[54] RECESSED TRANSFORMER ELECTRICAL OUTLET BOX WITH INTEGRAL TELEPHONE LINE CONNECTION

[76] Inventor: Thomas E. Cottone, P.O. Box 6010, Marietta, Ga. 30065

[21] Appl. No.: 351,670

[22] Filed: Dec. 8, 1994

[51] Int. Cl.$^6$ .................................................. H02G 3/10
[52] U.S. Cl. ........................... 174/53; 174/67; 220/3.94; 220/4.02
[58] Field of Search ..................... 174/53, 58, 67; 220/242, 3.3, 3.5, 3.92, 3.94, 4.02; 439/535, 536

[56] References Cited

U.S. PATENT DOCUMENTS

| | | | |
|---|---|---|---|
| 2,441,643 | 5/1948 | Mickler | 174/53 |
| 2,987,909 | 6/1961 | Shlank | 174/67 |
| 3,293,588 | 12/1966 | Blonder | 156/359 |
| 3,652,781 | 3/1972 | Robbins | 174/67 |
| 4,063,110 | 12/1977 | Glick | 174/67 |
| 4,109,095 | 8/1978 | Kling et al. | 174/67 |
| 4,424,407 | 1/1984 | Barbic | 174/67 |
| 4,479,688 | 10/1984 | Jennings | 439/536 |
| 4,613,728 | 9/1986 | Lathrop | 174/53 |
| 4,758,687 | 7/1988 | Lathrop | 174/53 |
| 4,988,832 | 1/1991 | Shotey | 174/67 |
| 5,024,614 | 6/1991 | Dola et al. | 174/48 |
| 5,114,365 | 5/1992 | Thompson et al. | 174/66 |
| 5,148,348 | 9/1992 | White | 174/67 |
| 5,257,946 | 11/1993 | MacMillan et al. | 439/536 |
| 5,299,943 | 4/1994 | Shieh | 439/136 |
| 5,354,953 | 10/1994 | Nattel et al. | 174/58 X |
| 5,419,716 | 5/1995 | Sciammarella et al. | 439/535 X |

FOREIGN PATENT DOCUMENTS 4-346497A 12/1992 Japan.

Primary Examiner—Peter S. Wong
Assistant Examiner—Paramita Ghosh
Attorney, Agent, or Firm—Jones & Askew

[57] ABSTRACT

A recessed transformer AC electrical wall outlet box for recessing modular 120 volt alternating current (VAC) transformers and/or power converters within a wall-mounted electrical outlet box, while at the same time providing a standard RJ-11 modular telephone jack connection on the face plate. A first well is provided for enclosing a commonly sized modular transformer for electrical devices, such as a cordless telephone base station. A conventional AC electrical outlet is provided in the well. An aperture is provided in a wall leading into a second, rear well for receiving the 120 VAC electrical wiring that is connected to the outlet. A second aperture, spaced apart from the first aperture, opens into the first well for the telephone wire. The telephone wire is connected to a standard RJ-11 modular telephone jack provided in a face plate that detachably affixed to the outlet box. The face plate covers and retains the modular transformer, and includes an opening to pass the power connector plug from the modular transformer to a power jack of the cordless telephone base station.

16 Claims, 2 Drawing Sheets

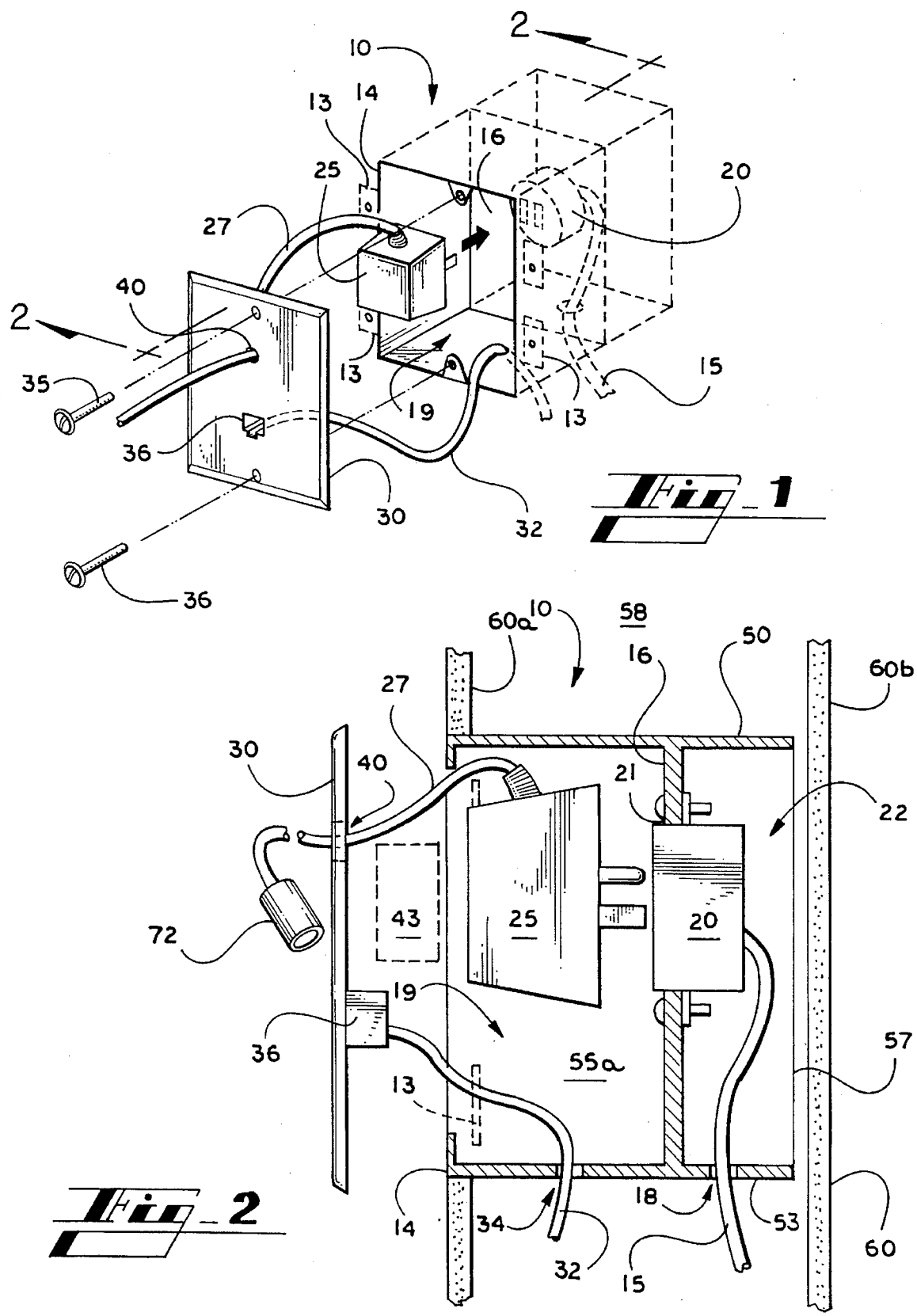

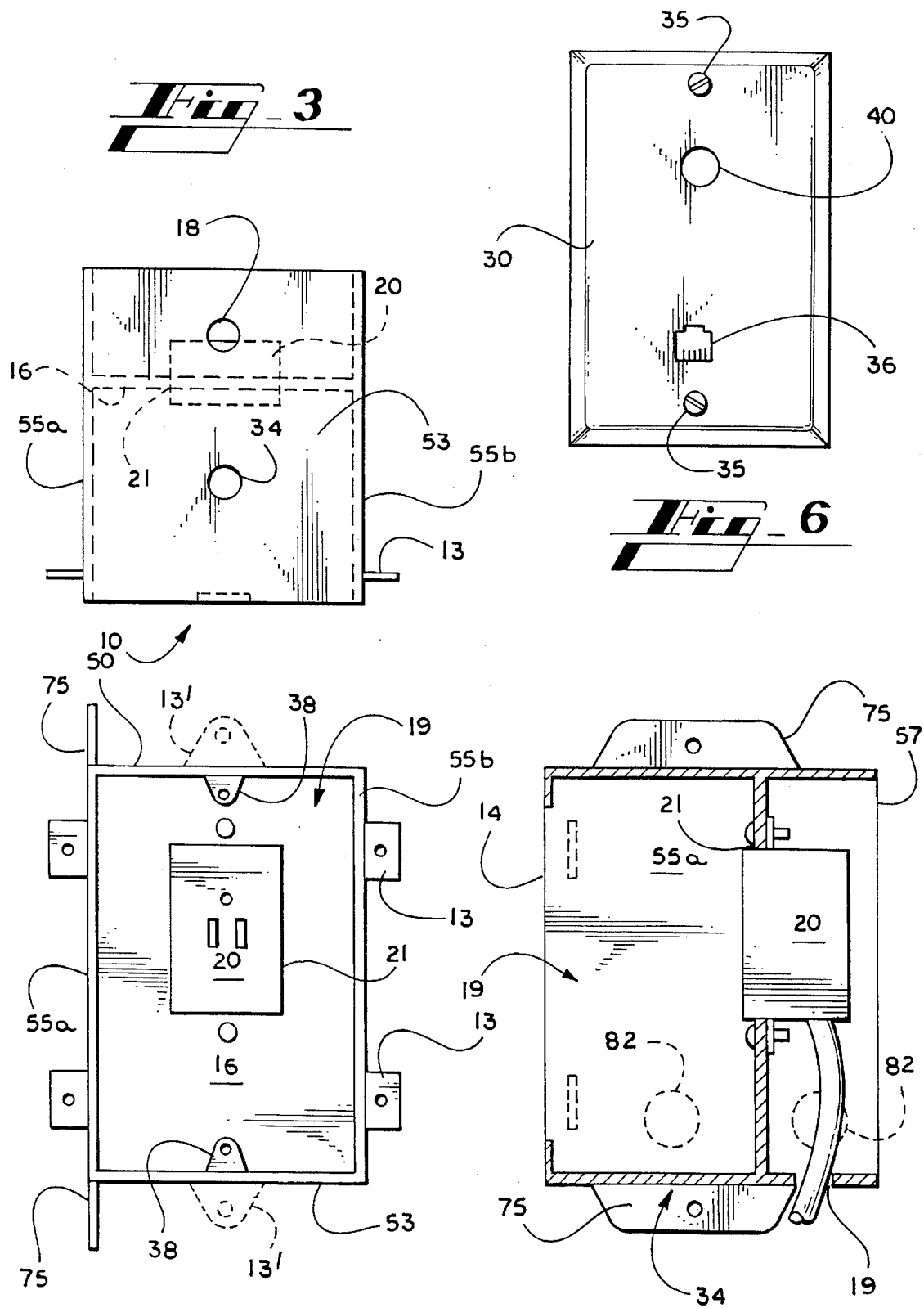

RECESSED TRANSFORMER ELECTRICAL OUTLET BOX WITH INTEGRAL TELEPHONE LINE CONNECTION

TECHNICAL FIELD

The present invention relates generally to wall mounted recessed electrical outlets, and more particularly relates to a wall mounted recessed electrical outlet for housing a modular transformer for powering a consumer electrical device (such as a cordless telephone), with an integral telephone line connector in the face plate.

BACKGROUND OF THE INVENTION

In the kitchens of modern homes, telephone jacks or outlets are often provided in wall surfaces along cabinets so as to facilitate connection of a kitchen telephone. Usually, there are also one or more AC electrical outlets along the wall for powering consumer electrical devices such as toasters, mixers, blenders, etc. Typically, these electrical outlets are mounted at cabinet top height. However, the telephone jacks are not always located close to an electrical outlet, and are in a separate junction box, with separate wiring.

Cordless telephones (i.e., hand-held portable, battery powered radiotelephones) have become enormously popular in recent years, and many cordless telephones wind up in the kitchen because of the convenience of cordless conversations while working. Most cordless telephone include a "base station", which houses a battery charger, sometimes a speakerphone and microphone, and circuitry for connecting to a telephone jack. Generally, the base station is powered by AC electrical power, so a cord and plug to an AC electrical outlet must be provided, as well as a modular telephone cable for connecting to the telephone jack.

It is readily apparent that two (2) separate electrical wires must be run from the base station to wall outlets—one being an AC electrical cord and the other being the telephone cord. The result is an unsightly mess of cords, which often run in opposite directions to one another when the telephone jack is not close to the AC outlet.

Many modern-day consumer electrical device, especially cordless telephone base stations, are powered by modular transformers or power converters. These modular transformers convert 120 volt AC electrical power into a lower voltage AC or DC current for powering the electrical device. These modular transformers are small, usually boxy devices that plug directly into a wall outlet, with a smaller cord that extends to the device powered. Usually, the modular transformers are rather bulky, heavy, and take up a good bit of space.

Because most wall outlets are vertical, modular transformers are usually suspended in a vertical position when plugged in, held in only by the friction between the outlet and the prongs of the transformer. After the passage of time, the sheer weight of the transformer tends to cause it to fall out of the outlet unless the prongs are extremely tight. The modular transformers in any event are unsightly and add to the clutter of the power cord and telephone line.

Certain types of recessed electrical outlets are known in the art. One known type of recessed electrical outlet, called a "clock outlet", provides a hook for hanging an electric clock and a circular recess for receiving and recessing a standard size AC electrical plug associated with the clock. Examples of such a recessed "clock outlet" are shown in U.S. Pat. Nos. 2,262,712 and 2,317,382. Devices of this type are not designed for use with modular transformers, nor do they contemplate accommodation of a telephone connection.

U.S. Pat. No. 4,988,832 to Shotey describes a wall mounted recessed electrical outlet, including a housing having recessed female outlets mounted therein for receiving and containing male plugs plugged therein. A pivotally or removably attached lockable cover, flush with the adjacent wall surface, is provided to seal the opening to the housing against intrusion of foreign matter while accommodating externally extending cord from the plugged-in male plugs.

While the device shown in this patent effectively serves to recess plugs, there is no contemplation for or provision for any type of telephone connection, let alone any coordination between power requirements and connection of the telephone line. Rather, the Shotey device is intended for outdoor applications, and includes a cover with openings disposed at its lower extent for exit of a power cord.

Accordingly, there is a need for a device or system for retaining modular transformers for consumer electrical devices such as cordless telephones, while also providing convenient and ready access to the telephone system. Prior to the present invention, such devices have not existed.

SUMMARY OF THE INVENTION

Briefly described, the present invention provides a recessed transformer AC electrical wall outlet box for recessing modular 120 volt alternating current (VAC) transformers and/or power converters within a wall-mounted electrical outlet box, while at the same time providing a standard RJ-11 modular telephone jack connection on the face plate. The recessed transformer outlet box includes a first or forward well for enclosing and retaining commonly sized modular transformers for electrical devices, especially cordless telephone base stations. A conventional AC electrical outlet is provided along an interior wall of the well, with 120 volt AC electrical connections physically isolated from the well by an interior separating wall. An aperture or opening is provided in a bottom wall of the outlet box leading into a second, rear well for receiving the 120 VAC electrical wiring that is connected to the outlet.

The outlet box also includes a second aperture or opening, disposed forwardly along the bottom wall of the box relative to the power wire aperture, spaced apart from the first aperture, for receiving a telephone wire. The second aperture opens into the first or forward well, and allows a length of the telephone wire to accumulate in the well. The telephone wire is preferably connected to a standard RJ-11 modular telephone jack provided in a face plate that removably attaches to the outlet box.

The face plate preferably removably attaches to the wall outlet box with a pair of screws in the conventional manner, thereby covering and retaining the modular transformer. The face plate includes an opening or aperture through which a standard size power connector plug from the modular transformer may be passed to connect to a power jack on the cordless telephone base station. The face plate also provides a standard RJ-11 telephone jack for plugging in the telephone.

The recessed outlet box is of a standard size (about 3½ inches deep) including both the rear well for 120 VAC electrical connection and the forward well for the modular transformer, and can therefore be mounted on standard 2×4 wall studs in new construction, or readily added to existing structures. The face plate is aesthetically pleasing, and includes the modular telephone jack and an aperture for the modular transformer's power cord and connector.

Advantageously, a recessed outlet box constructed in accordance with the present invention allows for a modular transformer or power converter to be completely hidden from view and enclosed within the forward well of the outlet box, while allowing the power connector cord from the modular transformer to extend through the faceplate and connect to the cordless telephone base station, while also permitting connection to the telephone system of an RJ-11 modular telephone plug from the base station of the cordless telephone. All these features are preferably provided in a single molded plastic housing that separates the electrical power provided to the 120 VAC outlet from the well that houses the modular transformer, and allows accumulation of a sufficient length of telephone line cord within the confines of the well so that the face plate can be removed from the outlet box for service without disconnecting the RJ-11 telephone jack.

Alternatively, the face plate can be hinged for quick access to the modular transformer and inspection or repair of the RJ-11 telephone jack.

Accordingly, it is an object of the present invention to provide a recessed transformer outlet box for recessing AC modular transformers and/or power converters within a wall-mounted outlet box while at the same time providing a standard RJ-11 telephone line jack on the face plate for cordless telephone base stations.

It is another object of the present invention to provide a recessed transformer outlet box that electrically isolates, for safety reasons, the connections for a 120 VAC electrical outlet from a region through which extends telephone wire and jack.

It is another object of the present invention to provide a recessed electrical outlet with accompanying detachable face plate that allows connection of a telephone line and electrical power for a consumer electrical device such as a cordless telephone base station in the same junction box, thereby saving space and reducing cabinet clutter.

It is another object of the present invention to provide a recessed electrical outlet that is simple in structure and compatible with existing housing construction techniques.

These and other objects, features, and advantages will become apparent to those skilled in the art after review of the following detailed description of the preferred embodiment taken together with the appended drawings and claims.

BRIEF DESCRIPTION OF THE DRAWING FIGURES

FIG. 1 is a perspective exploded view of a recessed transformer outlet box with telephone line connection constructed in accordance with the preferred embodiment of the present invention.

FIG. 2 is a cross-sectional view taken along the line 2—2 of FIG. 1.

FIG. 3 is a bottom plan view of the preferred embodiment shown in FIG. 1.

FIG. 4 is a front view of the preferred embodiment shown in FIG. 1.

FIG. 5 is a cross-sectional view of the preferred embodiment shown in FIG. 1, without the transformer.

FIG. 6 is a front view of the preferred face plate of the preferred embodiment shown in FIG. 1.

DETAILED DESCRIPTION OF THE PREFERRED EMBODIMENT

Turning now to the drawings, in which like numerals indicate like elements throughout the several views, FIG. 1 illustrates a recessed transformer outlet box 10 constructed in accordance with the present invention. The outlet box 10 is mounted to a standard electrical opening in drywall in between standard two-inch by four-inch (2×4) wall studs via nail flanges 13 that extend outwardly from the front edge 14 of the outlet box. An interior divider wall 16 separates the outlet box into a first or front well 19 and a second or rear well 22.

At least one 120 VAC receptacle 20 is mounted in an opening 21 on the interior divider wall surface 16 of the housing, with the electrical outlet opening into the front well 19 and the power 120 VAC power connections to the receptacle being made in the rear well 22. The receptacle 20 is conventional, and includes threaded tabs for receiving standard outlet/switch mounting screws that pass through screw holes in the wall 16 and affix the receptacle to the wall.

A face place 30 mounts to the front of the outlet box 10 with a pair of screws 35 in a conventional manner, and includes a conventional RJ-11 modular telephone jack 36 and an aperture 40. A conventional 120 VAC modular transformer or power converter 25 plugs into the AC power outlet, and the transformer power cord 27 emanating from the transformer extends to and through the aperture 40 in the face plate. Therefore, the modular transformer 25 is recessed and enclosed within the front well 19 of the outlet box, while the transformer power cord 27 can be connected to a consumer electrical device such as a cordless telephone base station, and a telephone wire with modular RJ-11 plug from the cordless telephone based station can be plugged into the RJ-11 jack 36.

The face plate 30 retains the modular transformer in place plugged into the outlet 20, and prevents its dislodgment by gravity or otherwise. If desired, an optional spacer 43 (see FIG. 2) made of rubber, plastic, or other suitable (preferably nonconducting) material, sized appropriately, may be inserted between the face plate 30 and transformer 25 to assist in retaining the transformer in a plugged-in state.

FIG. 2 shows that the preferred outlet box 10 comprises a top wall 50, a bottom wall 53, and left and right side walls 55a, 55b, respectively, of which the left wall 55a is visible. As shown, the box 10 is typically mounted adjacent to a 2×4 stud 58, between a first drywall panel 60a and a second drywall panel 60b that defines the wall of an adjacent room. The walls 50, 53, 55a, 55b of the outlet box extend continuously from the front edge 14 of the box to a rear edge 57, thereby defining the front well 19 and rear well 22.

The interior vertical wall 16 of the outlet box separates the front well 19 that houses the transformer 25 from the rear well 22. Wiring 15 for 120 VAC power extends into the rear well and connects to the outlet 20. The interior wall 16 therefore separates and electrically isolates power connections provided to the AC power outlet 20 from the telephone wire for safety purposes.

The walls 50, 53, 55a, 55b of the outlet box preferably extend about 3½ inches in total depth, which is approximately the standard distance between the interior room drywall panels 60a, 60b in standard housing construction methods. When mounted, the rear edge 57 preferably almost abuts the drywall panel 60b of the adjacent room, effectively closing off access to the electrical connection and the rear well 22. Of course, it will be understood that the depth may be more or less than 3½ inches depending upon the particular needs, and still be in accordance with the present invention of providing a recessed outlet box with electrical isolation between telephone and power connections.

As best seen in FIG. 3, the bottom wall 53 includes a pair of spaced apart apertures or openings 18, 34 for introduction of the AC electrical wiring 15 and telephone wire 32, respectively. The AC electrical wire opening 18 opens into the rear well 22 to allow electrical connection to the back of the AC power outlet 20 in the known manner.

The telephone line access aperture 34 in the bottom wall 53 extends into the front well 19, and is spaced apart frontwardly of the AC wire aperture 18 preferably about 1½ to 2 inches to provide additional physical isolation and separation of the telephone wire from the electrical wire. In addition, the front well is preferably of a size to accommodate an excess length of telephone wire 32 so as to permit removal of the face plate and placement a distance off without disconnecting the jack.

The plastic material of the outlet box may be scored to make knock-outs for the openings 18, 34, if desired, for applications where a recessed electrical outlet is desired but a telephone jack is not.

Although the preferred embodiment includes both the access port 18 for the electrical wiring and the phone line access opening 34 on the bottom wall 53, it will be understood and appreciated that these openings could also be included on the top wall 50, left side wall 55a, or right side wall 55b, either on the same walls, or, preferably, on different walls for further physical separation of electrical wiring from telephone wiring. Preferably, therefore, the bottom wall 53, top wall 50, left side wall 55a, and right side wall 55b are provided with scored or punched knock-outs in various locations, as shown in dotted relief at 82 on the left side wall 55a in FIG. 5, it being understood that such knock-outs may be provided on any of such walls.

As best seen in FIG. 4, the recessed outlet box 10 includes nail flanges 13, four or more in the preferred embodiment, positioned either along or close to the front edge of the outlet box, on the left and right side walls 55a, 55b, respectively. The outlet box is preferably nailed or screwed into the drywall panel 60a in the known manner.

Alternatively, and as shown in dotted relief in FIG. 4, nail flanges 13' may be provided on the top and bottom of the outlet box.

For new housing construction (in contrast to renovation or remodeling of existing construction), it is common practice to provide vertically extending interior nail flanges 75 along an edge of a side wall (e.g. 55a) of the outlet box so that the box may be nailed to the 2×4 before installation of the drywall. Such methods are known to be faster with new construction than using fasteners on the front such as 13 and 13'. This type of nail flanges may also be provided. Those skilled in the art will understand that any of such attachment flanges 13, 13', 75 may be scored for snap-off/knock-off removability, if desired.

Preferably, the face plate 30 is affixed to the outlet box 10 by use of conventional face plate screws 35 that are threadingly engaged with threaded holes provided in face plate attachment flanges 38. The face plate attachment flanges are conventional and extend inwardly from the top wall 50 and bottom wall 53 slightly into the front well 19. Thus, the face plate may be rigidly secured to the outlet box once the transformer 25 has been plugged into the outlet, and retained therein by the face plate. This advantageously prevents the modular outlet from being subjected to dislodgment from being hit or as the result of gravity and loose electrical prongs.

Preferably, the aperture 40 in the face plate is of sufficient size or diameter to allow passage of a commonly sized transformer cord plug 72 that plugs into consumer electrical devices such as cordless telephone base stations. Many of these transformer cord plugs are cylindrical devices approximately one-quarter (¼) inch in diameter, so the preferred size of the aperture 40 is at least one-quarter (¼) inch.

Preferably, both the face plate 30 and the recessed transformer outlet box 10 are constructed of a fire resistant plastic, such as Underwriter's Laboratory listed ABS type plastic obtained from Borg-Warner Corporation and other similar sources.

From the above description of the preferred recessed electrical outlet box 10, it will become apparent that it may be used in conjunction with new construction or in conjunction with existing construction. Furthermore, it may be used in conjunction with cinder block walls, dry walls, plywood walls, and other types of conventional and presently used construction techniques. Upon installation, the recessed electrical outlet box has a front face essentially flush with the supporting wall 60a, whether or not any electrical plugs are inserted. The face plate 30 protects the well or interior of the box and prevents unanticipated contact with the modular transformer 25 from dislodging the transformer from the outlet.

Although the face plate 30 is preferably attached with screws, it may alternatively be constructed with a hinge along one edge and latched or otherwise fastened by a spring, hook, U-type attachment device or other types of fastening means. Therefore, the face plate can be pivotally attached or secured by any of various means while also providing access to the interior for purposes of inserting or removing modular transformers or servicing the RJ-11 telephone jack.

While the principles of the invention have now been described in connection with the preferred embodiment, it will be understood by those skilled in the art that many modifications may be made of structure, arrangement, proportions, elements, materials and components used in the practice of the invention that are particularly adapted for specific environments and operating requirements without departing from the scope and spirit of the following claims.

What is claimed is:

1. A combination wall mounted telephone jack and recessed electrical outlet mountable essentially flush with a surface of a building wall, comprising:

a housing;

means for securing said housing to said building wall;

outer wall means on said housing defining a top, bottom, and sides of said housing;

said outer wall means defining a recessed first well with an opening that opens on said surface of said building wall for receiving and enclosing a modular AC power transformer having electrical prongs for plugging into an electrical outlet socket, and a second well;

a vertically extending interior dividing wall dividing said housing into said first well and said second well;

an electrical outlet socket mounted on said interior dividing wall for receiving said electrical prongs of said modular AC power transformer;

a first aperture in said outer wall means opening into said first well for receiving telephone wiring;

a second aperture in said outer wall means opening into said second well, for receiving an electrical AC wiring for said electrical outlet socket; and a face plate detachably mountable to said housing to cover and enclose said first well, said face plate including a telephone jack connected to said telephone wiring and an aperture for allowing passage therethrough of an electrical connector and cable extending from said modular AC power transformer.

2. The combination wall mounted telephone jack and recessed electrical outlet of claim 1, wherein said first aperture and said second aperture are both on a bottom wall of said outer wall means, spaced apart from each other.

3. The combination wall mounted telephone jack and recessed electrical outlet of claim 1, wherein said securing means comprises nail flanges along said outer wall means.

4. The combination wall mounted telephone jack and recessed electrical outlet of claim 1, wherein said outer wall means comprises a substantially flat top wall, bottom wall, left side wall, and right side wall.

5. The combination wall mounted telephone jack and recessed electrical outlet of claim 1, wherein said outer wall means extend to a depth from said opening that opens on said surface of said building wall to a rear edge defined by said second well, said rear edge being substantially abutted against a drywall panel of a second building wall when said electrical outlet is affixed to said building wall.

6. The combination wall mounted telephone jack and recessed electrical outlet of claim 5, wherein said depth of said outer wall means is about three and one-half (3½) inches.

7. The combination wall mounted telephone jack and recessed electrical outlet of claim 1, wherein said first aperture and said second aperture are defined by a plurality of selectably removable knock-outs defined in said outer wall means.

8. A recessed electrical outlet box mountable essentially flush with a surface of a building wall, comprising:

a top wall extending from a front edge to a rear edge, said front edge being essentially flush with said surface of said building wall when said outlet box is mounted;

a left side wall extending from said front edge to said rear edge;

a right side wall extending from said front edge to said rear edge;

a bottom wall extending from said front edge to said rear edge;

an interior divider wall positioned within the volume enclosed by said top wall, said right side wall, said left side wall, and said bottom wall, said interior divider wall together with said top wall, said right side wall, said left side wall, and said bottom wall dividing the outlet box into a front well and a rear well;

an electrical outlet opening defined in said interior divider wall for receiving an electrical outlet having an electric socket accessible from said front well and electrical connections accessible from said rear well;

at least one knock-out scoring defined in at least one of said top wall, said right side wall, said left side wall, or said bottom wall for providing a first opening in a selected wall into said rear well, to allow passage of electrical wiring from behind said surface of said building wall to said electrical connections within said rear well; and at least one additional knock-out scoring defined in at least one of said top wall, said right side wall, said left side wall, or said bottom wall for providing a second opening in a selected wall into said front well, to allow passage of telephone wiring from behind said surface of said building wall to within said front well.

9. The recessed electrical outlet box of claim 8, further comprising an electrical outlet mounted in said electrical outlet opening.

10. The recessed electrical outlet box of claim 8, further comprising a face plate detachably mountable to faceplate attachment flanges extending from said top wall and said bottom wall inwardly of said forward well.

11. The recessed electrical outlet box of claim 8, further comprising a plurality of attachment flanges affixed to said outlet box for attaching said outlet box to a building support.

12. The recessed electrical outlet box of claim 8, wherein said knock-out scoring for said first opening is in said bottom wall.

13. The recessed electrical outlet box of claim 8, wherein said additional knock-out scoring for said second opening is in said bottom wall.

14. A recessed electrical outlet box mountable essentially flush with a surface of a building wall, comprising:

a housing;

means for securing said housing to said building wall;

outer wall means on said housing defining an exterior surface of said housing;

said outer wall means defining a recessed first well with an opening that opens on said surface of said building wall for receiving and enclosing a modular AC power transformer having electrical prongs for plugging into an electrical outlet socket, and a second well;

a vertically extending interior dividing wall dividing said housing into said first well and said second well;

an opening for mounting said electrical outlet socket on said interior dividing wall;

a first aperture in said outer wall means opening into said first well for receiving telephone wiring from behind said surface of said building wall to within said first well; and a second aperture in said outer wall means opening into said second well, for receiving an electrical AC wiring from behind said surface of said building wall to within said second well, said electrical AC wiring being connected to said electrical outlet socket within said second well.

15. The combination wall mounted telephone jack and recessed electrical outlet of claim 14, wherein said outer wall means comprises a top wall, a bottom wall, a left side wall, and a right side wall.

16. The combination wall mounted telephone jack and recessed electrical outlet of claim 14, wherein said first aperture and said second aperture are both on a bottom wall of said outer wall means, spaced apart from each other.

* * * * *